(12) United States Patent
Salzman et al.

(10) Patent No.: US 7,886,693 B1
(45) Date of Patent: Feb. 15, 2011

(54) PET BED

(76) Inventors: Scott Salzman, 2624 Freeman Ct., Erie, CO (US) 80516; Braden Lindley Smith, 716 Sedge Way, Lafayette, CO (US) 80026

( * ) Notice: Subject to any disclaimer, the term of this patent is extended or adjusted under 35 U.S.C. 154(b) by 132 days.

(21) Appl. No.: 11/562,615

(22) Filed: Nov. 22, 2006

(51) Int. Cl.
*A01K 1/035* (2006.01)
(52) U.S. Cl. .................... 119/28.5; 248/231.71
(58) Field of Classification Search ........... 119/28.5, 119/416; D30/118; 248/118.1, 231.61, 231.71, 248/918
See application file for complete search history.

(56) References Cited

U.S. PATENT DOCUMENTS

| | | | |
|---|---|---|---|
| 4,497,278 A | 2/1985 | Balder et al. | |
| 4,597,359 A | 7/1986 | Moorman | |
| 4,672,898 A | 6/1987 | Davidson | |
| 5,161,484 A | 11/1992 | Duane | |
| 5,220,884 A | 6/1993 | Townsend | |
| 5,265,558 A | 11/1993 | Schonrock | |
| 5,405,109 A * | 4/1995 | Nordnes | 248/118.3 |
| 5,509,373 A | 4/1996 | Elesh | |
| 5,709,164 A | 1/1998 | Batterton | |
| 5,833,180 A * | 11/1998 | Baranowski | 248/118 |
| 5,931,102 A | 8/1999 | Grahl | |
| 5,975,469 A * | 11/1999 | Chen | 248/118.1 |
| 6,109,571 A | 8/2000 | Hirschovits et al. | |
| D434,881 S | 12/2000 | Yang | |
| D436,697 S | 1/2001 | Fiore et al. | |
| 6,347,771 B1 * | 2/2002 | Lauzon et al. | 248/118 |
| 6,588,366 B1 | 7/2003 | Ranson et al. | |
| 6,591,778 B1 | 7/2003 | Alderman | |
| 6,786,461 B1 * | 9/2004 | Tsai et al. | 248/118.3 |
| 6,968,810 B2 * | 11/2005 | Bishop | 119/847 |
| 7,159,827 B2 * | 1/2007 | Bombelli | 248/118.1 |
| 2002/0096118 A1 * | 7/2002 | Kolozsvari | 119/28.5 |

OTHER PUBLICATIONS

Merriam Webster Online Dictionary, eccentrically [http://www.merriam-webster.com/dictionary/eccentrically, retrieved from internet: Jun. 24, 2008].*

* cited by examiner

*Primary Examiner*—Rob Swiatek
*Assistant Examiner*—Kristen C Hayes
(74) *Attorney, Agent, or Firm*—Maxey Law Offices, PLLC; Stephen Lewellyn

(57) ABSTRACT

A pet bed having an upright column removably attachable at one end to the edge of a desk top, table top or other similar horizontal surface. The support column extends vertically upward from the desk top and supports a horizontal support member at an elevated position above the desk top. A cushion is attached to the support member and substantially covers an upper surface thereof, providing a comfortable resting place of an animal. The column is eccentrically attached to the support member and the support member is rotatable in a plane normal to the vertical axis of the column permitting the support member to be rotated above the desk top into a position where a maximum portion of the support member is positioned above the desk top and through various positions until a minimum portion of the support member is positioned above the desk top. The support member and attached cushion are removable from the column and can be used in a remote position as a self-supporting, free standing pet bed.

8 Claims, 5 Drawing Sheets

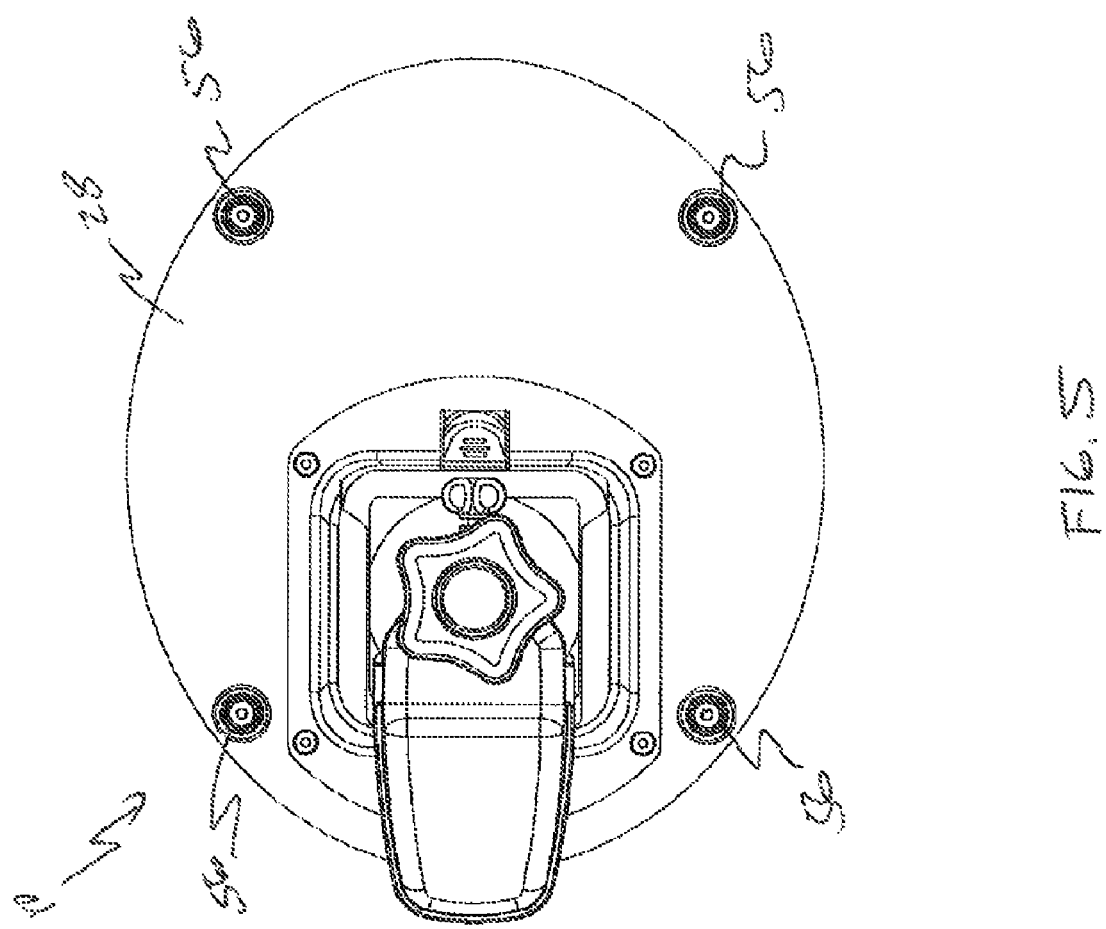

PET BED

FIELD OF THE INVENTION

The invention relates generally to the field of pet beds and more particularly to a pet bed that is removably attachable to a horizontal surface, such as a desk which provides a pet resting area that is elevated from the horizontal surface.

BACKGROUND OF THE INVENTION

Pet beds for dogs and cats alike have become increasing popular by the owners of such pets to provide a comfortable resting place for their pets. There exist many different styles of pet beds, one of such, is supported from a window sill and which typically includes a hard, flat rectangular surface that is covered with carpet or fabric and includes means for attaching the pet bed to the window sill. Another style of pet bed is designed to rest upon a floor surface and which is often constructed of a poly foam material covered in fabric and includes a base forming a tray type construction. Yet another style of bed includes a frame with a flexible covering. The frame is typically rectangular, with rigid legs extending downwardly to engage the floor. In some cases, the legs are detachable or fold for transportation and storage. In yet another style of bed, the bed is design to be attached to an article of furniture having a removable cushion, such as for example a bed or couch and includes a planar support member that extends outward from one sidewall that is sandwiched between a mattress or cushion and the underlying support of the furniture.

While the pet beds heretofore fulfill their respective, particular objectives and requirements, they do not address or provide a solution to pets or owners wanting to be in close proximity with each other during times or locations that the presence of the pet is inconvenient or disturbing to the owner, such as for example while the owner is sitting at a desk working.

SUMMARY OF THE INVENTION

The present invention provides a pet bed that can be removably attached to the edge of a desk, table top or other similar horizontal surface where the bed portion is elevated above the horizontal surface and is rotatable with respect to the surface to vary the portion of the bed that is directly above the surface. Further, the bed portion can be removed from the remaining portion of the pet bed and be used as a self-supporting, free standing bed.

In general, in one aspect, a pet bed is provided that includes a support of sufficient size to accommodate a domestic animal; an upraised support column having opposed first and second ends, the first end thereof being eccentrically attached to the support; and a clamp means for releasably securing the second end of the support column to an edge of a support surface such that the support is elevated from the support surface.

In general, in another aspect, a pet bed is provided that includes a support of sufficient size to accommodate a domestic animal, the support being rigid and generally horizontal and including an upper surface and a lower surface; the support having an attachment portion eccentrically located on the lower surface; an upraised support column having opposed first and second ends, the first end thereof being removably attachable to the support at the attachment portion; a clamp means for releasably securing the second end of the support column to an edge of a support surface such that the support is elevated from the support surface; a cushion removably attachable to the support such that the upper surface is substantially covered by the cushion; and wherein the support is rotatable in a plane normal to the vertical axis of the support column.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 5 is a diagrammatic bottom plan view of a pet bed, according to an exemplary disclosed embodiment.

DETAILED DESCRIPTION OF THE PREFERRED EMBODIMENT

Reference will now be made in detail to the drawings. Wherever possible, the same reference numbers will be used throughout the drawings to refer to the same or like parts.

Figure 1:
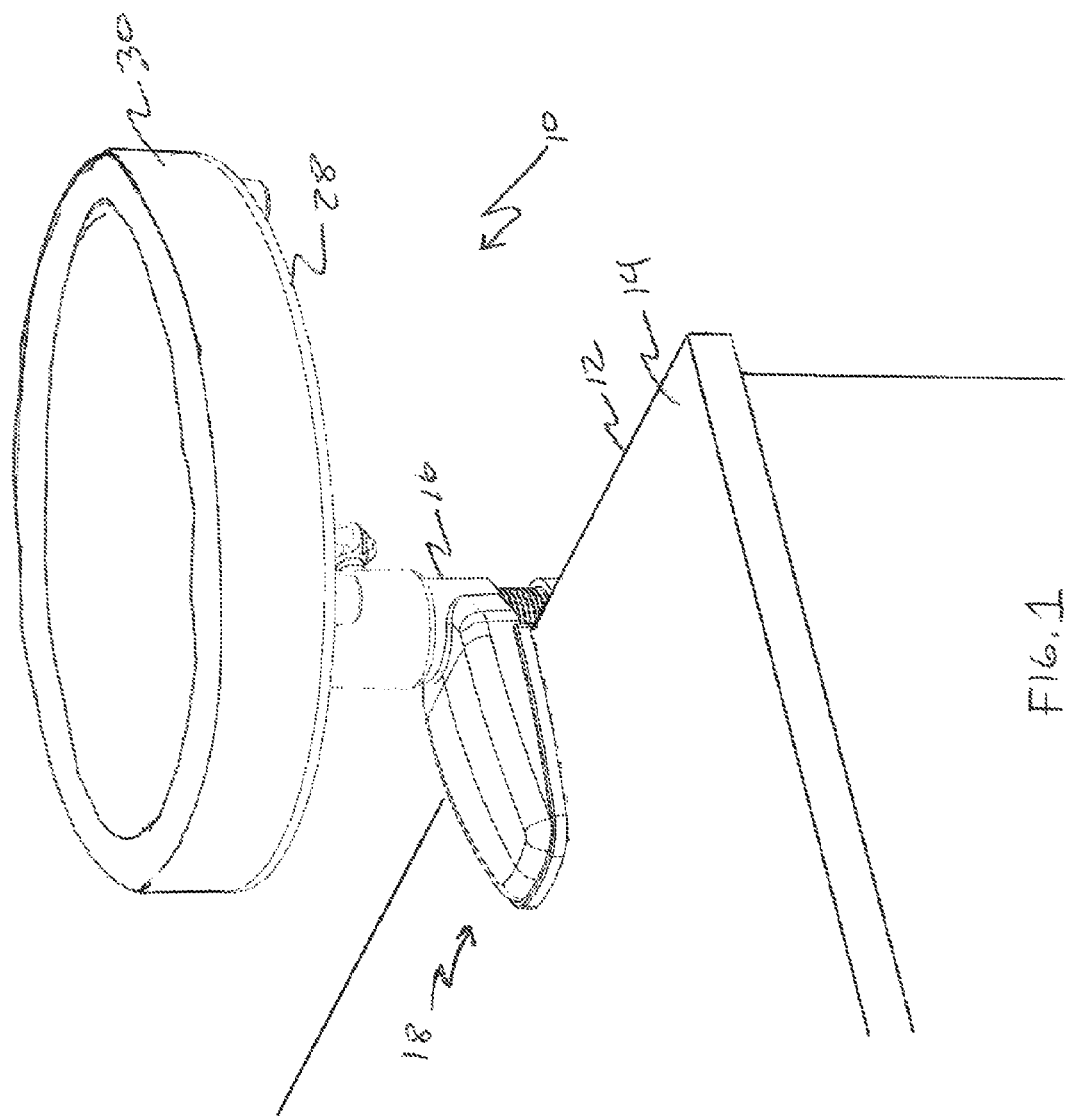
FIG. 1 is a diagrammatic perspective view of a pet bed, according to an exemplary disclosed embodiment.

Referring now to FIG. 1, there is shown a perspective view of a pet bed 10 constructed in accordance with the principals of the invention attached to an edge 12 of a desk top, table, or other similar horizontal surface 14. Broadly, the pet bed 10 includes an upright column 16 attached at one end to the edge 12 of the desk top 14 by a clamps means 18. The support column 16 extends substantially vertically upward from the desk top 14 and supports a horizontal support member 28 at an elevated position above the desk top. A cushion 30 is attached to the support member 28 and substantially covers an upper surface thereof providing a comfortable resting place for an animal such as a cat or dog, for example.

Figure 2:
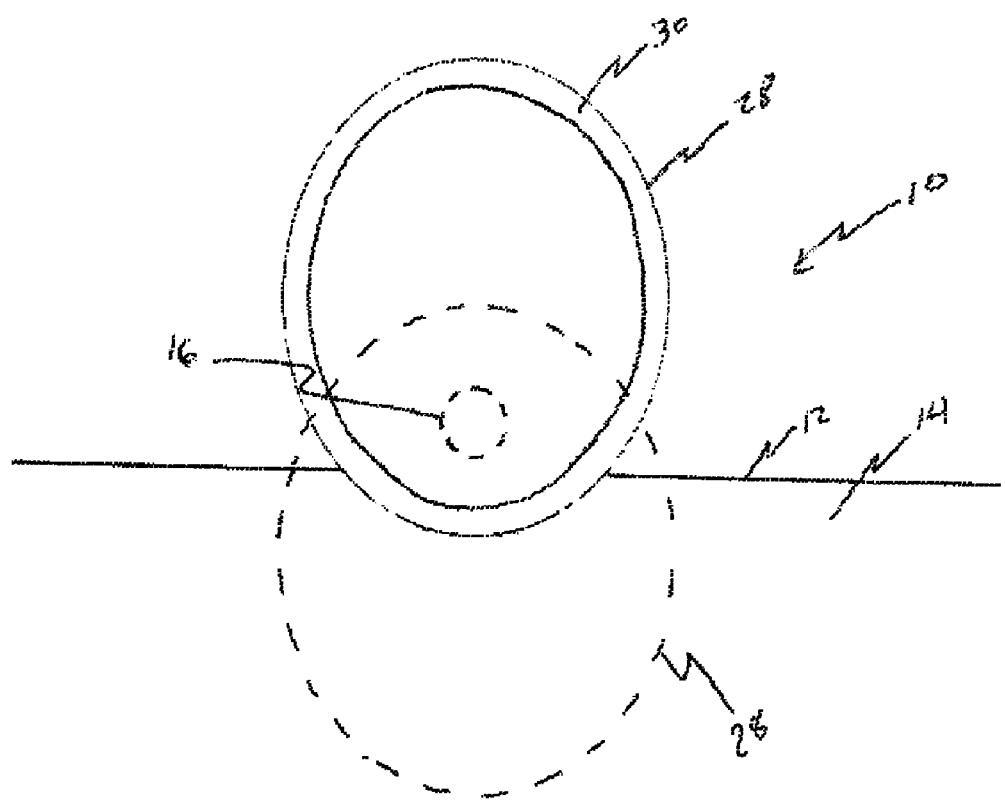
FIG. 2 is a diagrammatic top plan view of the pet bed, according to an exemplary disclosed embodiment.

The column 16 is eccentrically attached to the support member 28 and the support member 28 is rotatable in a plane normal to the column 16 permitting the support member to be rotated above the desk top 14 into a position where a maximum portion of the support member is positioned above the desk top 14 and through various positions until a minimum portion of the support member is positioned above the desk top, as best shown in FIG. 2.

Figure 3:
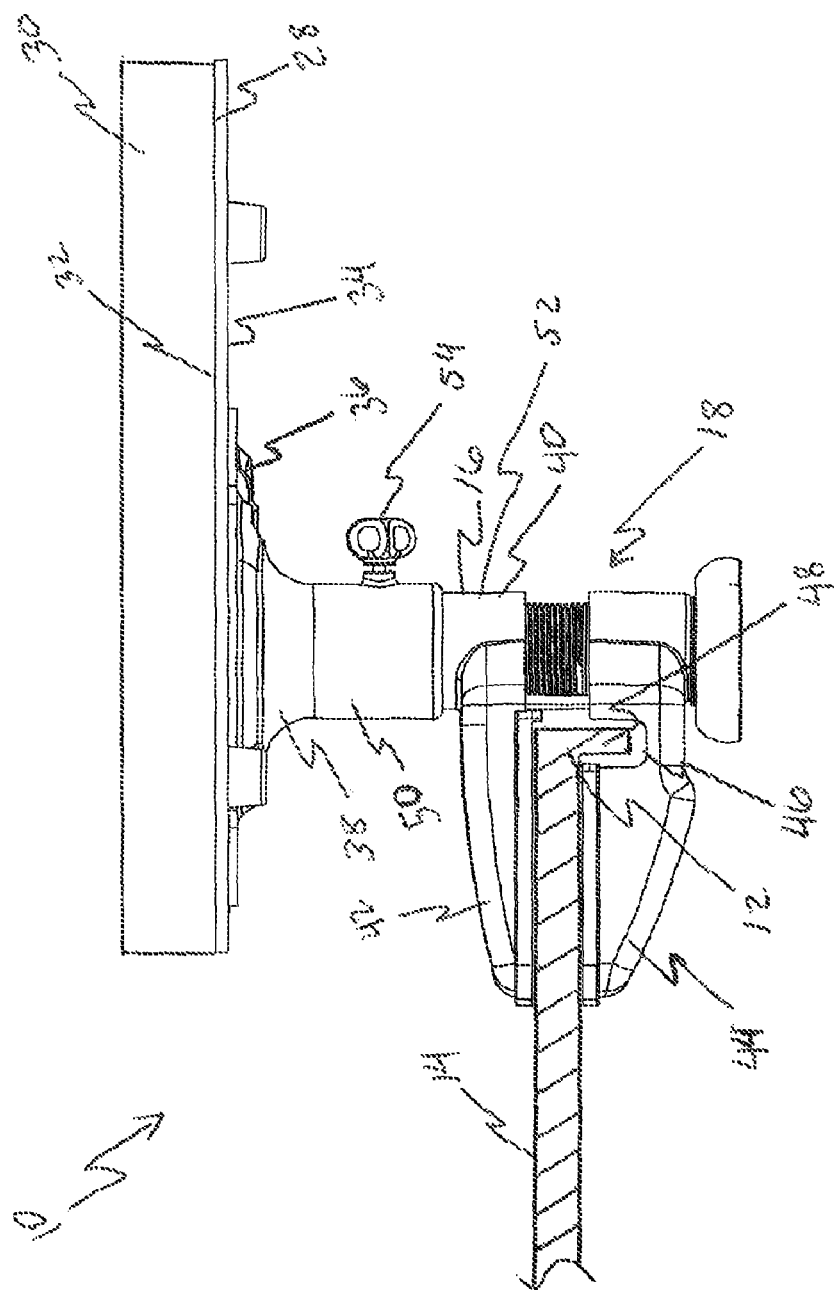
FIG. 3 is a diagrammatic side elevation view of a pet bed, according to an exemplary disclosed embodiment.
Figure 4:
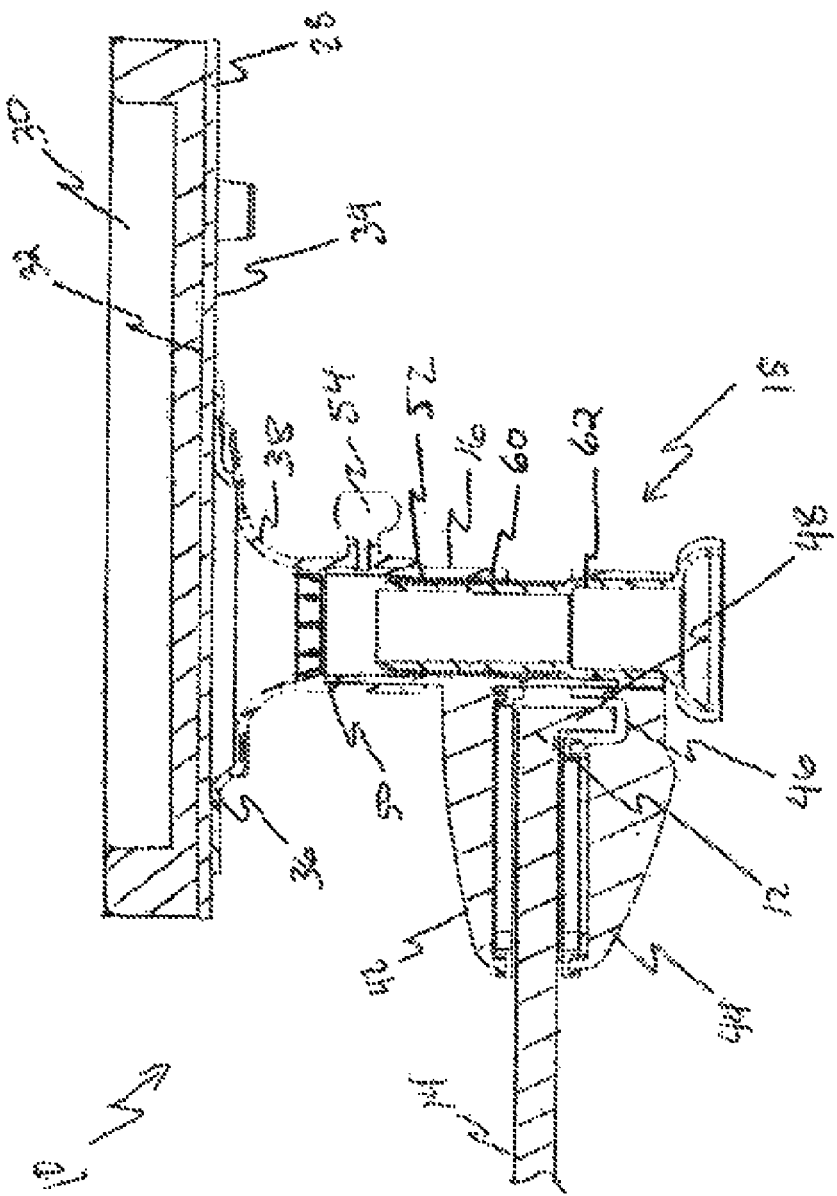
FIG. 4 is a diagrammatic cross sectional view of a pet bed, according to an exemplary disclosed embodiment.

Now with reference to FIGS. 3-4, the support member 28 is rigid, generally plate-like and includes an upper surface 32 and a lower surface 34. The support member 28 can be of any shape, however circular or oval is preferred. The support member is of a sufficient size to accommodate a domestic animal, such as a cat or similar sized dog for example. While the intended use is directed towards an animal such as a cat or dog, many different animals having a similar or smaller size may make use of the pet bed. As such, the phrase "domestic animal" should not be construed to being limited to traditionally domesticated animals but rather should be interpreted as meaning any animal of a size that is similar to that of a traditionally domesticated animal such as for example, a cat or similar sized dog and the like. Further, it should be noted, one or more sidewalls can extend upwardly from the support member 28 forming a bed structure having a tray-type construction with the support member forming the base or bottom of the bed. The sidewalls can be formed integrally with the support member 28.

The cushion 30 is removably attachable to the support member 28. Ideally the cushion is of a size that substantially covers the upper surface 32 thereof. The means used to removably attach the cushion 30 to the support member 28 is not particularly important as the applicant envisions many suitable methods. Such suitable methods can include but are not limited to straps and/or mating fasteners such as snaps or pile fasteners. The cushion 30 can be constructed of a poly foam type material or the like covered in fabric and includes a base forming a tray type construction.

The support member 28 includes an attachment portion 36 eccentrically located on the lower surface 32 thereof. Preferably, the attachment portion 36 is eccentrically located on the major axis of the support member 28. The attachment portion 36 can be monolithic with the support member 28 or can be a separate member that is affixed thereto. The column 16 is removably attachable at a first end 38 thereof to the support member 28 at the attachment portion 36. Both the attachment portion 36 and end 38 include cooperating structures to permit removably attaching the column 16 to the support member 28.

An opposed, second end 40 of the support column 16 is removably attached to the edge 12 of the desk top 14 by the clamping means 18. The clamping means 18 includes two opposed jaw members 42, 44 that can be brought close together to clamp the edge 12 of the desk top 14 on opposed surfaces thereof. The clamping means 18 can include a provision for accommodating desk tops or the like which have a downwardly projecting lip portion along the edge thereof, as best shown in FIG. 3. Many desk tops or the like include a decorative fascia applied along the edges which typically include a lip portion 48 that extends below the bottom or underside surface of the desk top. The clamping means 18 includes a recessed portion 46 formed in the lower jaw member 44 of a size to accommodate the lip portion 48 ensuring even contact between the lower jaw and the underside surface of the desk top.

It is important to note, the particular construction of the clamping means 18 is not critical to the operability of the pet bed 10. The applicant envisions that many different constructions of clamps could reasonably be used in place of the clamping means 18 as illustrated to facilitate the same purpose, which is to removably attach the column 16 to the edge 12 of the desk top 14 such that the support member 28 is elevated above the desk top. As a non-limiting example, the applicant envisions that many different forms of C-type clamps or many different forms of spring-type clamps could reasonably be substituted for the C-type clamp forming part of the clamping means 18 as illustrated.

The column 16 can be of a two piece construction including a first tubular member 50 and a second tubular member 52 telescopically received by the first member forming a pintle which the first member is rotatable about, thereby permitting the rotation of the support member 28. The angle of rotation between the first and second members 50, 52 can be fixedly retained by thumb screw 54 or the like. The thumb screw 54 is threadably received through the first member 50 and can be threaded inward to abut the second member 52, thereby preventing rotation thereof with respect to the first member. An exemplary alternative to the thumb screw 28 could be a spring biased pin which engages the second member 52 to prevent rotation thereof. Further, while it is not shown, it is contemplated the length of the column 16 can be adjusted by telescoping the first and second members 50,52 relative to each other.

With reference to FIG. 4, in an embodiment, the second tubular member 52 includes an upper portion 60 and a knob portion 62 threadably attached to the upper portion 60. Jaw member 42 is contiguous with the upper portion 60 and jaw member 44 is contiguous with knob portion 62. Threading knob portion 62 moves jaw member 44 relative to jaw member 42.

It is further contemplated, the column 16 could take on other forms of construction such as being unitary where the first end 38 and the attachment portion 36 form a pivot for rotation of the support member 28 and the second end 40 is fixedly attached to the clamping means 18. Of course the opposite of this is also possible, where the first end 38 could be fixedly attached to the attachment portion 36 or ultimately the support member 28 and the attachment between the second end 40 and the clamping means 18 could form the pivot for rotation of the support member 28. A thumb screw or the like can be include in either of these constructions to restrain rotation of the support member 28.

With reference to FIG. 5, a plurality of leg members 56 are spacedly attached to the lower surface 34 of the support member 28 about the perimeter thereof. Each leg member 56 extends downwardly from the support member 28 and terminates at a ground engaging end. The leg members 56 permit the support member to placed on a support surface once removed from the support column 16. In this arrangement, a user can use the pet bed 10 as attached to the desk top or as a free standing bed where the support member 28 and attached cushion 30 are detached from the support column. This is advantageous as a consumer is provided with a dual functioning product that combines a self-supporting pet bed that can be placed virtually on any support surface and a supported pet bed that is removably attachable to the edge of a desk or the like.

A number of embodiments of the present invention have been described. Nevertheless, it will be understood that various modifications may be made without departing from the spirit and scope of the invention. Accordingly, other embodiments are within the scope of the following claims.

We claim:

1. A pet bed, comprising:
   a generally horizontal and rigid support including upper and lower surfaces, said upper surface of a sufficient size to accommodate a domestic animal;
   a support column having a first column member and a second column member telescopically and rotatably received by said first column member such that said first column member is free to rotate about a vertical axis of said support column, said first column member providing a first end of said support column, said first end eccentrically attached to said support at said lower surface thereof such that said support is rotatable in a horizontal plane only about said vertical axis and such that said support is restrained from displacement relative to said first end;
   a clamp including a lower jaw member and an upper jaw member which clamp the edge of a mounting surface on opposed surfaces thereof to releasably secure said second end of said support column to an edge of a mounting surface such that said support is elevated from the mounting surface, said lower jaw member and said upper jaw member attached contiguously to said second column member; and
   wherein said second column member includes an upper portion and a knob portion, said knob portion including a threaded end that is threadably received by a threaded bore of said upper portion, said upper jaw member contiguous with said upper portion and said lower jaw member contiguous with said knob portion, wherein turning said knob portion moves said lower jaw member relative to said upper jaw member.

2. The pet bed of claim 1, wherein said support is rotatable about said vertical axis between a position where a maximum portion of said support is positioned above the mounting surface and a position where a minimum portion of said support is positioned above the mounting surface.

3. The pet bed of claim 2, further comprising:
   a plurality of legs spacedly attached to said lower surface of said support about the perimeter thereof.

4. The pet bed of claim 2, further comprising:
   a cushion removably attachable to said support such that said cushion substantially covers said upper surface.

5. The pet bed of claim 2, wherein said support is generally oval shaped.

6. The pet bed of claim 1, further comprising:
   a plurality of legs spacedly attached to said lower surface of said support about the perimeter thereof.

7. The pet bed of claim 1, further comprising:
   a cushion removably attachable to said support such that said cushion substantially covers said upper surface.

8. The pet bed of claim 1, wherein said support is generally oval shaped.

* * * * *